US012550055B2

(12) United States Patent
Yang et al.

(10) Patent No.: US 12,550,055 B2
(45) Date of Patent: Feb. 10, 2026

(54) COMMUNICATION PREDICTION-BASED ENERGY SAVING METHOD AND APPARATUS

(71) Applicant: Huawei Technologies Co., Ltd., Shenzhen (CN)

(72) Inventors: Shuigen Yang, Shenzhen (CN); Yinghao Jin, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 18/147,621

(22) Filed: Dec. 28, 2022

(65) Prior Publication Data

US 2023/0164690 A1 May 25, 2023

Related U.S. Application Data

(63) Continuation of application No. PCT/CN2021/097939, filed on Jun. 2, 2021.

(30) Foreign Application Priority Data

Jun. 30, 2020 (CN) .......................... 202010618590.X

(51) Int. Cl.
*H04W 52/02* (2009.01)
*H04W 52/14* (2009.01)
(52) U.S. Cl.
CPC ....... *H04W 52/0206* (2013.01); *H04W 52/14* (2013.01)
(58) Field of Classification Search
CPC . H04W 24/02; H04W 24/08; H04W 52/0203; H04W 52/0206; H04W 52/14; H04W 52/02; Y02D 30/70
(Continued)

(56) References Cited

U.S. PATENT DOCUMENTS 10,021,650 B2* 7/2018 Wong .................... H04L 49/201
2010/0284316 A1* 11/2010 Sampathkumar .........................
H04W 52/0216
370/311

(Continued)

FOREIGN PATENT DOCUMENTS

CN 109803285 A 5/2019
CN 110996377 A 4/2020
(Continued)

OTHER PUBLICATIONS

"Summary of Rel-17 email discussion on AI-based network," Agenda item: 9.1.3, Source: ZTE (moderator), Document for: Discussion and Decision, 3GPP TSG-RAN #86, RP-192579, Sitges, Spain, Dec. 9-12, 2019, 9 pages.

*Primary Examiner* — Nathan S Taylor
(74) *Attorney, Agent, or Firm* — Slater Matsil, LLP

(57) ABSTRACT

A communication prediction-based energy saving method and an apparatus, the method including receiving, by a first radio access network device, from a second network device a communication prediction result that includes a communication period, traffic, a periodic communication indication, or a burst communication indication, where the traffic represents a predicted uplink or downlink data traffic volume, where the periodic communication indication represents whether communication predicted to occur is periodic, and when the communication predicted to occur is periodic, a communication interval, or the uplink or downlink data traffic volume of the periodic communication, where the burst communication indication represents whether the communication predicted to occur is bursty, and, when the communication predicted to occur is bursty, a time point, the uplink or downlink data traffic volume of the burst communication, and performing, by the first radio access network (Continued)

device, an energy saving operation based on the communication prediction result.

19 Claims, 6 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2011/0222418 A1* | 9/2011 | Kang | H04W 52/0216 |
| | | | 370/252 |
| 2017/0142661 A1* | 5/2017 | Wong | H04L 49/201 |
| 2018/0295548 A1* | 10/2018 | Kumar | H04W 36/008375 |
| 2019/0042522 A1* | 2/2019 | Peleska | H04W 52/02 |
| 2021/0100000 A1* | 4/2021 | Zachrison | H04W 72/52 |

FOREIGN PATENT DOCUMENTS

| | | | | |
|---|---|---|---|---|
| CN | 111148118 A | 5/2020 | | |
| CN | 112118587 A | 12/2020 | | |
| EP | 2849478 A1 * | 3/2015 | ............ | H04W 24/02 |

* cited by examiner

COMMUNICATION PREDICTION-BASED ENERGY SAVING METHOD AND APPARATUS

CROSS-REFERENCE TO RELATED APPLICATIONS

This application is a continuation of International Application No. PCT/CN2021/097939, filed on Jun. 2, 2021, which claims priority to Chinese Patent Application No. 202010618590.X, filed on Jun. 30, 2020. The disclosures of the aforementioned applications are hereby incorporated by reference in their entireties.

TECHNICAL FIELD

Embodiments of this application relate to the field of communications technologies, and in particular, to a communication prediction-based energy saving method and an apparatus.

BACKGROUND

Currently, global energy and environment problems are serious, and increasing energy consumption and soaring prices cause telecom network operation costs to stay high. In a telecom network, a ratio of energy consumption of a base station to total energy consumption of the telecom network continuously increases. Therefore, energy saving of the base station becomes an important problem.

In a conventional technology, the base station determines, based on current traffic load, whether to perform an energy saving operation, for example, switching off a radio frequency channel, switching off a carrier frequency, or switching off a symbol. However, inappropriate traffic load determining causes a failure to meet a quality of service of a user. For example, when load of a current user in a cell is low, the base station determines that a condition for switching off a radio frequency channel is met, and therefore the base station switches off the radio frequency channel of the cell, and migrates the user in the cell to a target cell. However, after the radio frequency channel of the current cell is switched off, if traffic of the user in the target cell rapidly increases, the target cell is overloaded. As a result, the quality of service of the user cannot be met. Therefore, how to perform the energy saving of the base station under a condition of ensuring the quality of service of the user is a technical problem to be resolved in embodiments of this application.

SUMMARY

Embodiments of this application provide a communication prediction-based energy saving method and an apparatus, to perform energy saving under a condition of ensuring quality of service of a user.

According to a first aspect, a communication prediction-based energy saving method is provided. The method may be performed by a first radio access network (RAN) device or a component (such as a chip, a circuit, or another component) disposed in the first RAN device. The method includes but is not limited to the following.

The first RAN device receives a communication prediction result from a second network device. The first RAN device performs an energy saving operation based on the communication prediction result. For example, the first RAN device may first determine, based on an energy saving prediction result, whether to perform the energy saving operation. If the energy saving operation may be performed, the energy saving operation is then performed. The communication prediction result may include predicted communication behaviors of the first RAN device in a future period of time, including at least one of the following, including a communication period, traffic, a periodic communication indication, or a burst communication indication. The traffic represents at least one of a predicted uplink data traffic volume or a predicted downlink data traffic volume. The periodic communication indication represents whether communication predicted to occur is periodic, and if the communication predicted to occur is periodic, further represents at least one of a communication interval, the uplink data traffic volume, or the downlink data traffic volume of the periodic communication. The burst communication indication represents whether the communication predicted to occur is bursty, and if the communication predicted to occur is bursty, further represents at least one of a time point, the uplink data traffic volume, or the downlink data traffic volume of the burst communication.

According to the foregoing descriptions, the first RAN device may obtain communication behaviors in the future period of time, and comprehensively determine, with reference to future and current communication statuses, whether to perform the energy saving operation. Compared with a current solution, whether the energy saving operation may be performed is determined only based on a current traffic condition. A compromise between service performance and energy saving may be made, to avoid that quality of service deteriorates due to the energy saving operation.

In a possible implementation, the communication prediction result may be a communication prediction result of a network slice, a cell, or each of a plurality of users belonging to a same group, and the foregoing process in which the first RAN device performs an energy saving operation based on the communication prediction result includes the first RAN device determines, based on the communication prediction result, whether to perform the energy saving operation. If the energy saving operation may be performed, the first RAN device may switch off a radio frequency channel or a carrier of a cell.

According to the foregoing descriptions, when predicting a communication behavior of the network slice, the cell, or each of the plurality of users belonging to the same group in the first RAN device, if determining that the energy saving operation may be performed, the first RAN device may directly switch off the radio frequency channel or the carrier corresponding to the network slice, the cell, or each of the plurality of users. This is simple and easy to implement.

In another possible implementation, the communication prediction result may be a communication prediction result of a single user or each of a plurality of users not belonging to a same group, and the foregoing process in which the first RAN device performs an energy saving operation based on the communication prediction result includes the first RAN device determines, based on the communication prediction result, whether to perform the energy saving operation. If the energy saving operation may be performed, the first RAN device performs delayed scheduling and symbol power saving.

According to the foregoing descriptions, when a communication behavior of the single user or each of the plurality of users not belonging to the same group in the first RAN device is predicted, if it is determined that the energy saving operation may be performed, a service corresponding to the single user or the plurality of users is migrated to a public signal or a reference signal. Because the common signal or the reference signal needs to be sent in an entire communication process, resource overheads can be reduced.

In a possible implementation, the communication prediction result may be predicted by a core network device, a second RAN device, or a network control device (for example, an operations, administration and maintenance (OAM)). That is, the second network device may be the core network device, the second RAN device, the network control device, or the like.

Usually, it may be considered that a computing capability of the second network device that performs communication prediction is better than that of the first RAN device. Certainly, this is not limited. In this case, the second network device performs communication prediction, and the first RAN device does not need to perform communication prediction. This reduces computing overheads of the first RAN device.

In a possible implementation, in an architecture of a central unit (CU)-distributed unit (DU), the first RAN device may be a DU, and the CU or the central unit-user plane (CU-UP) may perform communication prediction. That is, the second network device may be the CU or the CU-CP.

Optionally, the communication prediction result may be carried in terminal device-associated signaling, non-terminal device-associated signaling, or protocol data unit (PDU) session user plane protocol information, where the terminal device-associated signaling includes a PDU session resource setup request message or a downlink non-access stratum transport message, the non-terminal device-associated signaling includes a next-generation setup request message or an access and mobility management function (AMF) configuration update message, and the PDU session user plane protocol information includes PDU session information.

According to the foregoing descriptions, the communication prediction request may be transmitted by using existing signaling, and no new signaling needs to be designed. Therefore, costs for designing the signaling are reduced, and compatibility with an existing solution is good.

Optionally, before that the first radio access network device receives a communication prediction result from a second network device, the method further includes the first radio access network device sends a communication prediction request to the second network device, where the communication prediction request is a communication prediction request of the single user, a communication prediction request of each of the plurality of users, a communication prediction request of the network slice, or a communication prediction request of the cell.

It can be learned from the foregoing descriptions that the first RAN device sends a specific communication prediction request to the second network device, to avoid that the second network device sends unnecessary communication prediction to the first RAN device. This reduces signaling overheads.

According to a second aspect, a communication prediction-based energy saving method is provided. The method is executed by a second network device or a component (a chip, a circuit, or the like) disposed in the second network device. The method includes the second network device obtains a communication prediction result. For example, the second network device may obtain the communication prediction result in an artificial intelligence manner. The second network device sends the communication prediction result to a first radio access network device. The communication prediction result includes one or more of the following, including a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication.

According to the foregoing descriptions, the second network device may predict a communication behavior of the first RAN device in advance, and send the communication prediction result to the first RAN device. When performing an energy saving operation, the first RAN device further considers a future communication behavior in addition to current traffic load. With reference to the two, whether to perform the energy saving operation is determined. This ensures quality of service of a user while energy consumption of the first RAN device is reduced, and a compromise between network performance and the energy consumption is made.

In a possible implementation, the communication prediction result is a communication prediction result of a network slice, a communication prediction result of a cell, a communication prediction result of each of a plurality of users belonging to a same group, a communication prediction result of a single user, or a communication prediction result of each of a plurality of users not belonging to a same group.

In a possible implementation, the second network device is a core network device, a second radio access network device, a network control device, a central unit (CU), or a central unit-control plane (CU-CP).

For example, the second network device may be a network data analytics function (NWDAF) network element. The NWDAF network element may obtain a start time point, duration, and traffic of communication that already exist in the first RAN device from a user plane function (UPF) network element or an AF network element, obtain a user identifier, a network slice identifier (S-NSSAI), a cell identifier, or the like of the first RAN device from an SMF, and process the foregoing information based on a preset artificial intelligence model (for example, an AlexNet network), to obtain the communication prediction result of the user, the network slice, or the cell in the first RAN device. In the foregoing artificial intelligence manner, the second network device can relatively precisely predict the communication behavior in the first RAN device.

Optionally, the communication prediction result is carried in terminal device-associated signaling, non-terminal device-associated signaling, or protocol data unit (PDU) session user plane protocol information, where the terminal device-associated signaling includes a PDU session resource setup request message or a downlink non-access stratum transport message, the non-terminal device-associated signaling includes a next-generation setup request message or an access and mobility management function (AMF) configuration update message, and the PDU session user plane protocol information includes PDU session information.

According to the foregoing descriptions, the second network device may transmit the communication prediction request by using existing signaling, and no new signaling needs to be designed. Therefore, costs for designing the signaling are reduced, and compatibility with an existing solution is good.

Optionally, before that the second network device sends the communication prediction result to a first radio access network device, the method further includes the second network device receives a communication prediction request from the first radio access network device, where the communication prediction request is a communication prediction request of the single user, a communication prediction request of each of the plurality of users, a communication prediction request of the network slice, or a communication prediction request of the cell.

According to the foregoing descriptions, after receiving the communication prediction request, the second network device sends the communication prediction result, to avoid sending an additional communication prediction result. This reduces signaling overheads.

According to a third aspect, an apparatus is provided. For beneficial effects, refer to the descriptions of the first aspect. The apparatus has a function of implementing the behavior in the method embodiment in the first aspect. The function may be implemented by executing corresponding hardware or software. The hardware or the software may include one or more modules corresponding to the foregoing function. In a possible design, the apparatus may include a communication unit, configured to receive a communication prediction result from a second network device, and a processing unit, configured to perform an energy saving operation based on the communication prediction result. The communication prediction result includes one or more of the following information, including a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. These units may perform the corresponding function in the method example in the first aspect. For details, refer to the detailed descriptions in the method example. Details are not described herein again.

According to a fourth aspect, an embodiment of this application further provides an apparatus. For beneficial effects, refer to the descriptions of the second aspect. The apparatus has a function of implementing the behavior in the method embodiment in the second aspect. The function may be implemented by executing corresponding hardware or software. The hardware or the software may include one or more modules corresponding to the foregoing function. In a possible design, the apparatus includes a processing unit, configured to obtain a communication prediction result, and a communication unit, configured to send the communication prediction result to a first radio access network device. The communication prediction result includes one or more of the following information, including a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. These units may perform the corresponding function in the method example in the second aspect. For details, refer to the detailed descriptions in the method example. Details are not described herein again.

According to a fifth aspect, an apparatus is provided. The apparatus may be the first RAN device in the method embodiment in the first aspect, or a chip disposed in the first RAN device. The apparatus includes a communication interface and a processor, and optionally, further includes a memory. The memory is configured to store a computer program or instructions. The processor is coupled to the memory and the communication interface. When the processor executes the computer program or the instructions, the apparatus is enabled to perform the method performed by the first RAN device in the method embodiment in the first aspect.

According to a sixth aspect, an apparatus is provided. The apparatus may be the second network device in the method embodiment in the second aspect, or a chip disposed in the second network device. The apparatus includes a communication interface and a processor, and optionally, further includes a memory. The memory is configured to store a computer program or instructions. The processor is coupled to the memory and the communication interface. When the processor executes the computer program or the instructions, the apparatus is enabled to perform the method performed by the second network device in the method embodiment in the second aspect.

According to a seventh aspect, a computer program product is provided. The computer program product includes computer program code. When the computer program code is run, the method performed by the first RAN device in the first aspect is enabled to be performed.

According to an eighth aspect, a computer program product is provided. The computer program product includes computer program code. When the computer program code is run, the method performed by the second network device in the second aspect is enabled to be performed.

According to a ninth aspect, this application provides a chip system. The chip system includes a processor, configured to implement a function of the first RAN device in the method in the first aspect. In a possible design, the chip system further includes a memory, configured to store program instructions and/or data. The chip system may include a chip, or may include a chip and another discrete device.

According to a tenth aspect, this application provides a chip system. The chip system includes a processor, configured to implement a function of the second network device in the method in the second aspect. In a possible design, the chip system further includes a memory, configured to store program instructions and/or data. The chip system may include a chip, or may include a chip and another discrete device.

According to an eleventh aspect, this application provides a computer-readable storage medium. The computer-readable storage medium stores a computer program. When the computer program is run, the method performed by the first RAN device in the first aspect is implemented.

According to a twelfth aspect, this application provides a computer-readable storage medium. The computer-readable storage medium stores a computer program. When the computer program is run, the method performed by the second network device in the second aspect is implemented.

DETAILED DESCRIPTION OF ILLUSTRATIVE EMBODIMENTS

Figure 1:
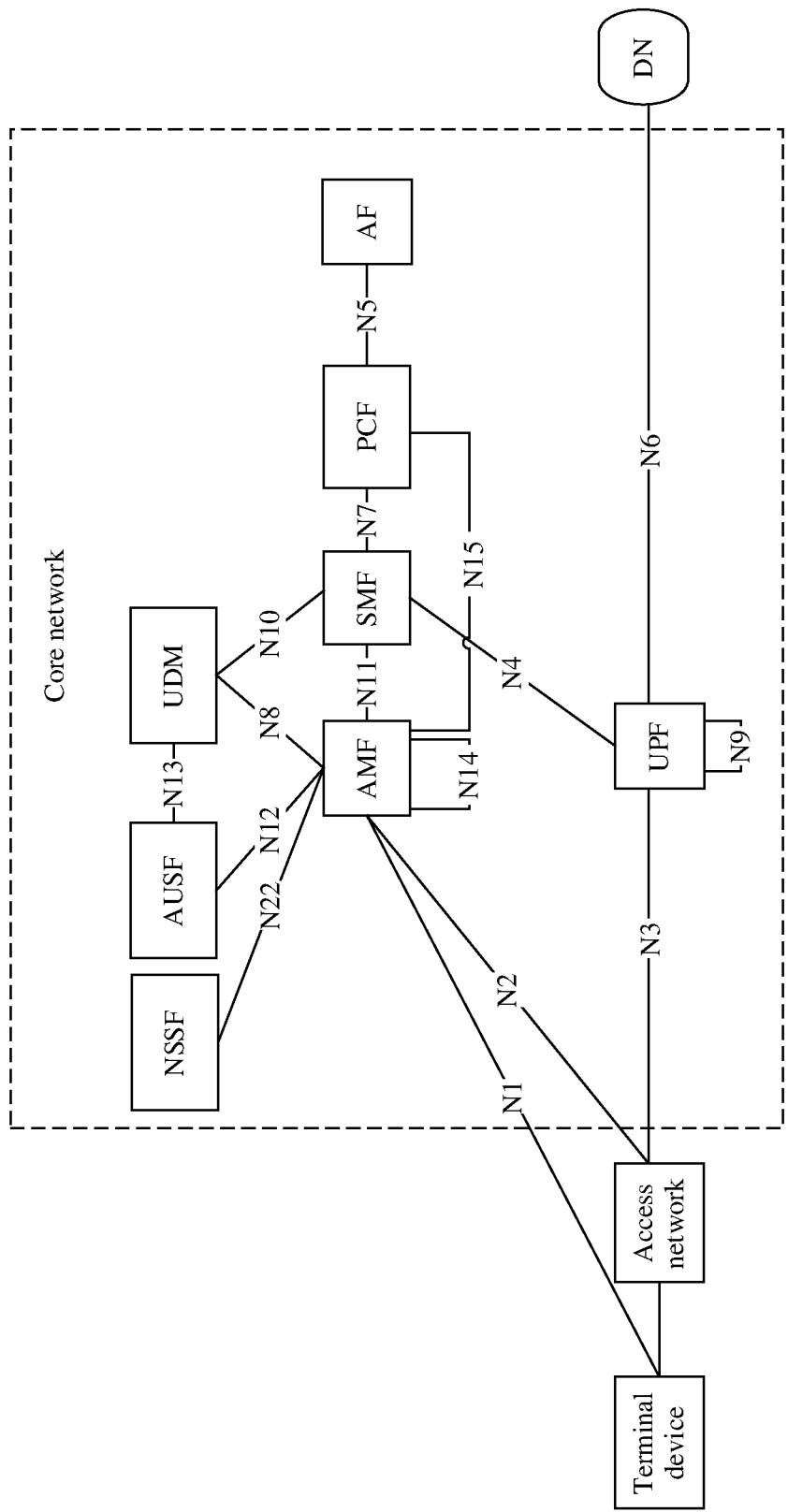
FIG. 1 is a schematic diagram of a network architecture according to an embodiment of this application.

As shown in FIG. 1, a network architecture is provided, including a core network (CN) device and a radio access network (RAN) device. The RAN device and the core network device may communicate with each other through a next generation (NG) interface, and different RAN devices may communicate with each other through an Xn interface.

The RAN device is a device that connects a terminal device to a wireless network, and may provide functions such as radio resource management, quality of service management, and data encryption and compression for the terminal device. For example, the RAN device may have the following several types, including the following.

1. A next generation node (gNB) provides a control plane and/or a user plane protocol and function of a new radio (NR) for a terminal device, and accesses a core network, for example, a 5G core network (5GC).

2. A next generation evolved node (ng-eNB) provides a control plane and/or user plane protocol and function of evolved universal terrestrial radio access (E-UTRA) for the terminal device, and accesses the core network, for example, 5GC.

The core network device is mainly configured to manage the terminal device and provide a gateway for communication with an external network. The core network device may include one or more of an access and mobility management function (AMF) network element, a session management function (SMF) network element, a user plane function (UPF) network element, a policy control function (PCF) network element, an application function (AF) network element, a unified data management (UDM) network element, an authentication server function (AUSF) network element, a network slice selection function (NSSF) network element, and a network data analytics function (NWDAF) network element. The AMF network element is mainly responsible for mobility management in a mobile network, such as user location update, user network registration, and user switching. The SMF network element is mainly responsible for session management in the mobile network, such as session establishment, modification, and release. For example, specific functions are allocation of an internet protocol (IP) address for a user and selection of a UPF network element that provides a packet forwarding function. The UPF network element is mainly responsible for forwarding and receiving user data. In downlink transmission, the UPF network element may receive the user data from a data network (DN), and transport the user data to the terminal device by using the RAN device. In uplink transmission, the UPF network element may receive the user data from the terminal device by using the RAN device, and forward the user data to the DN. Optionally, a transmission resource and a scheduling function in the UPF network element that provide a service for the terminal device may be managed and controlled by the SMF network element. The PCF network element mainly supports providing a unified policy framework to control a network behavior, and providing a policy rule for a control plane network function, and is responsible for obtaining policy-related subscription information of the user. The AF network element mainly supports interacting with a 3GPP core network to provide a service, for example, affecting a data routing decision-making and a policy control function, or providing some third-party services for a network side. The UDM network element is mainly configured to generate an authentication credential, process a subscriber identifier (for example, store and manage a subscription permanent identifier), control access authorization, manage subscription data, and the like. The AUSF network element is mainly configured to perform authentication when the terminal device accesses a network, including receiving an authentication request sent by a security anchor function (SEAF), selecting an authentication method, requesting an authentication vector from an authentication repository and processing function (ARPF), and the like. The NSSF network element is mainly configured to select a network slice instance for the terminal device, determine allowed network slice selection assistance information (NSSAI), configure the NSSAI, and determine an AMF set for serving the terminal device. The NWDAF network element is mainly responsible for functions such as data collection and analysis. It should be noted that the network elements in the core network may have different names in different communication systems. In the schematic diagram shown in FIG. 1, a 5th generation mobile communication system is used as an example for description, and this is not intended to limit this application.

Optionally, the network architecture shown in FIG. 1 may further include a terminal device. The terminal device may be referred to as a terminal for short, and is a device having a wireless transceiver function. The terminal device may be deployed on land, including being deployed indoor or outdoor or being handheld or vehicle-mounted, may be deployed on water (for example, on a ship), or may be deployed in the air (for example, on a plane, a balloon, or a satellite). The terminal device may be a mobile phone, a tablet computer (pad), a computer that has a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as a user equipment (UE), an access terminal device, a vehicle-mounted terminal device, an industrial control terminal device, a UE unit, a UE station, a mobile station, a remote station, a remote terminal device, a mobile device, a wireless communication device, a UE agent, a UE apparatus, or the like. The terminal device may be fixed or mobile. This is not limited in this embodiment of this application.

Optionally, the network architecture shown in FIG. 1 may further include a data network (DN). The DN may be a service network that provides a data service for the user. For example, the DN may be an IP multimedia service network or an internet. The terminal device may establish a protocol data unit (PDU) session from the terminal device to the DN, to access the DN.

Figure 2A:
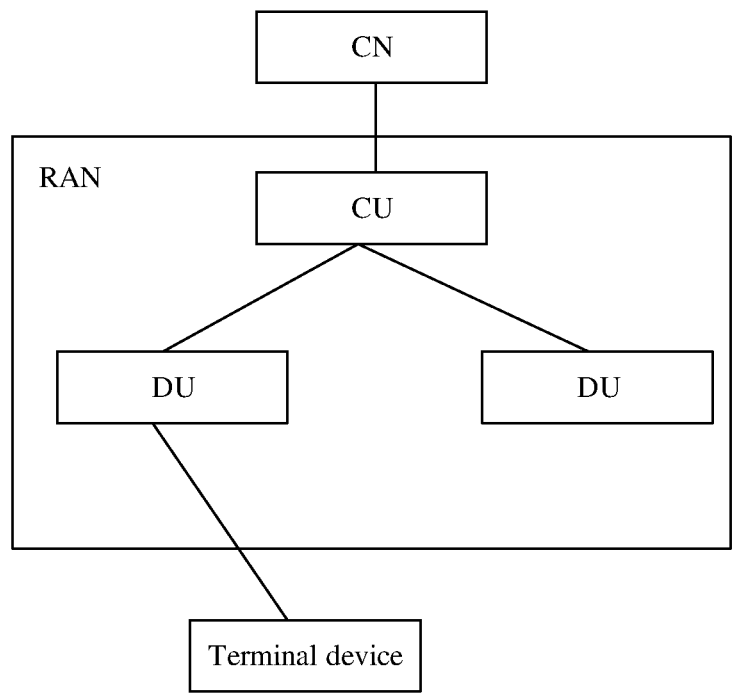
FIG. 2a and FIG. 2b each are a schematic diagram of a network architecture of an access network according to an embodiment of this application.

Refer to FIG. 2a. A RAN device may be further divided into a central unit (CU) and a distributed unit (DU) in terms of architecture.

1. CU: A CU mainly includes a radio resource control (RRC) layer, a service data adaptation protocol (SDAP) layer, and a packet data convergence protocol (PDCP) layer of a gNB, or an RRC layer and a PDCP layer of an ng-eNB.

2. DU: A DU mainly includes a radio link control (RLC) layer, a media access control (MAC) layer, and a physical layer (PHY) layer of the gNB or the ng-eNB.

It should be noted that one CU may be connected to one or more DUs. Further, refer to FIG. 2b. Functions of the CU may be further divided into the following.

1. Central unit-control plane (CU-CP): A central unit-control plane mainly includes an RRC layer in a gNB-CU or an ng-eNB-CU and a control plane at a PDCP layer.

2. Central unit-user plane (CU-UP): A central unit-user plane mainly includes an SDAP layer in the gNB-CU or the ng-eNB-CU, and a user plane at the PDCP layer.

Figure 2B:
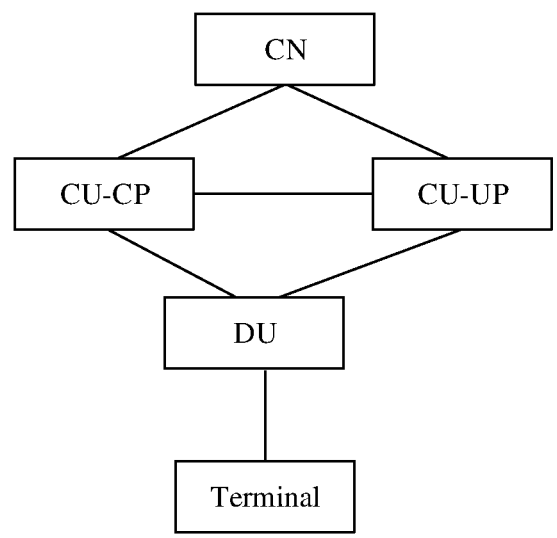

The network architectures and service scenarios that are described in FIG. 1, FIG. 2a, and FIG. 2b are intended to describe the technical solutions in embodiments of this application more clearly, and do not constitute a limitation on the technical solutions provided in embodiments of this application. A person of ordinary skill in the art may know that, with evolution of the network architectures and emergence of new service scenarios, the technical solutions provided in embodiments of this application are also applicable to similar technical problems.

In descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" refers to two or more than two unless otherwise specified. "At least one of the following items (pieces)" or a similar expression thereof means any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions or purposes. A person skilled in the art may understand that the terms such as "first" and "second" do not limit a quantity and an execution sequence, and the terms such as "first" and "second" do not indicate a definite difference.

Figure 3:
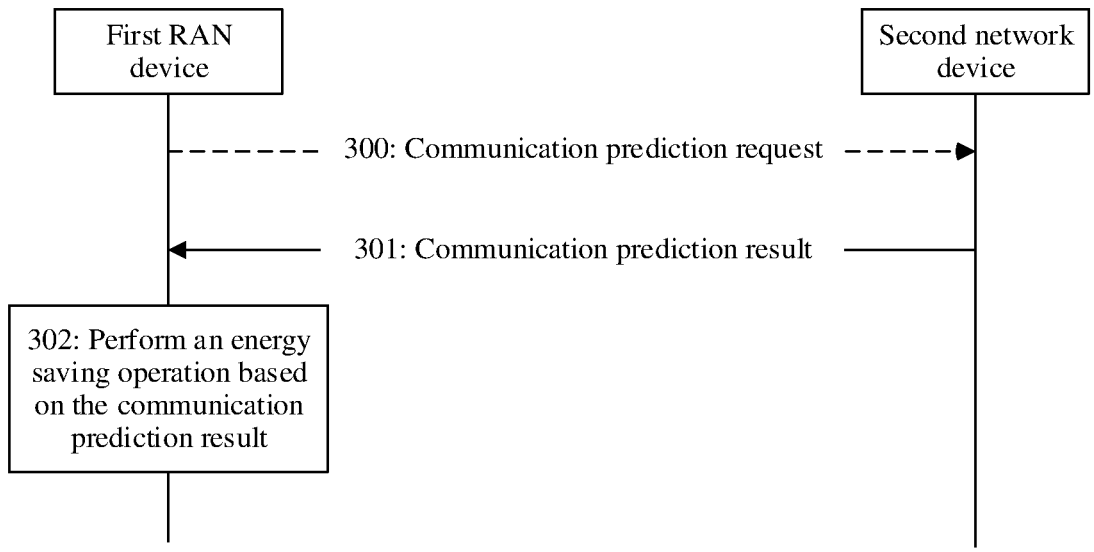
FIG. 3 is a flowchart of an energy saving method according to an embodiment of this application.

FIG. 3 is a flowchart of a communication method. This procedure includes but is not limited to the following operations.

Step 301: A first RAN device receives a communication prediction result sent by a second network device. Optionally, the second network device may be a core network device, a second RAN device, a CU, a CU-CP, a network control device, or the like. The second network device may obtain the communication prediction result in an artificial intelligence manner. In a possible implementation, the second network device is a network data analytics function (NWDAF) network element. The NWDAF network element may obtain a start time point, an end time point, duration, and traffic of communication that already exist in the first RAN device from a UPF network element or an AF network element, obtain a user identifier, a network slice identifier S-NSSAI, a cell identifier, or the like of the first RAN device from an SMF, and process the foregoing information based on a preset artificial intelligence model (for example, an AlexNet network, AlexNet), to obtain the communication prediction result of a user, a network slice, or a cell in the first RAN device.

Optionally, the communication prediction result in operation 301 may include communication prediction results of different granularities such as a single user, a plurality of users, the cell, or the network slice in the first RAN device. The communication prediction result may include at least one of a communication period, traffic, a periodic communication indication, or a burst communication indication. The communication period may include a start time point and duration, a start time point and an end time point, duration and an end time point, or the like. The start time point is a start time point of communication predicted to occur, the duration is duration of the communication predicted to occur, and the end time point is an end time point of the communication predicted to occur. The traffic represents at least one of a predicted uplink data traffic volume or a predicted downlink data traffic volume. The periodic communication indication represents whether communication predicted to occur is periodic, and further, if the communication predicted to occur is periodic, represents at least one of a communication interval, the uplink data traffic volume, or the downlink data traffic volume of the periodic communication. For example, a time interval of the periodic communication may be in a time unit of hour. The burst communication indication represents whether the communication predicted to occur is bursty, and if the communication predicted to occur is bursty, further represents at least one of a time point, the uplink data traffic volume, or the downlink data traffic volume of the burst communication. For example, the burst communication indication may indicate that the burst communication occurs at 15:00 on Apr. 15, 2020, and downlink data traffic of the burst communication is 500 megabytes. In a possible implementation, if the communication prediction result is the communication prediction result of the single user in the first RAN device, the communication prediction result may further include an identifier of the single user. For example, the identifier of the single user may be a RAN UE NGAP ID, used to uniquely identify a UE association over an NG interface within an NG-RAN node (unique identifies the UE association over the NG interface within the NG-RAN node), where the NG interface is an interface between the core network device and the RAN device, or may be an AMF UE NGAP ID, used to uniquely identify a UE association over an NG interface (unique identifies the UE association over the NG interface), or may be an NG-RAN node UE XnAP ID, used to uniquely identify a UE over an Xn interface within the NG-RAN node (unique identifies a UE over the Xn interface within the NG-RAN node), where the Xn interface is an interface between two RANs, or may be a CU UE F1AP ID, used to uniquely identify a UE association over an F1 interface within the CU, where the F1 interface is an interface between the CU and a DU, or may be a DU UE F1AP ID, used to uniquely identify a UE association over the F1 interface within the DU. It should be noted that in this embodiment of this application, the user, the terminal device, and the UE are not distinguished from each other, and may be replaced with each other.

In another possible implementation, if the communication prediction result is a communication prediction result of each of a plurality of users, and the plurality of users may belong to a same group, the communication prediction result may further include an identifier of the group, which, for example, may be a temporary mobile group identity (TMGI). Further, the communication prediction result may further include a ratio, used to represent a percentage of users having a same communication prediction result in the group.

In another possible implementation, if the communication prediction result is the communication prediction result of the network slice, the communication prediction result further includes an identifier of the network slice, which, for example, may be single network slice selection assistance information (S-NSSAI) that may uniquely identify the network slice. The network slice is a logical network that provides a specific network capability and network feature, and one network slice includes various resources that can meet service requirements. For a cell in a radio access network, a network slice supported by each cell may be configured by an operations, administration and maintenance (OAM) entity, and each network slice may be identified by using single network slice selection assistance information S-NSSAI. The S-NSSAI includes at least slice/service type (SST) information, and may further include slice differentiator (SD) information. The SST information indicates a behavior of the network slice, for example, indicates a feature and a service type of the network slice. The SD information is supplementary information of the SST. When the SST indicates a plurality of network slices, an SD is used to correspond to each network slice.

In another possible implementation, if the communication prediction result is the communication prediction result of the cell, the communication prediction result may further include an identifier of the cell, for example, a new radio cell global identifier (NR CGI), used to uniquely identify a new radio cell globally.

In a possible implementation, the second network device in operation 301 may be a core network device, and the core network device may send the communication prediction result to the first RAN device in the following manners.

1. The communication prediction result is sent to the first RAN device by using UE-associated signaling. For example, the communication prediction result is sent by using a PDU session resource setup request message or a downlink non-access stratum transport message. In other words, the PDU session resource setup request message or the downlink non-access stratum transport message may carry the communication prediction result.

2. The communication prediction result is sent to the first RAN device by using non-UE associated signaling. For example, the communication prediction result is sent by using an NG setup request message or an AMF configuration update message. In other words, the NG setup request message or the AMF configuration update message may carry the communication prediction result.

Optionally, the UE-associated signaling and the non-UE associated signaling may be transmitted according to a control plane protocol of the NG interface, for example, transmitted according to a next generation application protocol (NGAP).

3. The communication prediction result is sent to the first RAN device according to a PDU session user plane protocol. For example, the communication prediction result is sent by using downlink PDU session information. In other words, the downlink PDU session information may carry the communication prediction result. The PDU session user plane protocol is a user plane protocol of the NG interface, and is used to provide non-guaranteed distribution for a PDU session user plane PDU between the RAN device and the UPF.

Figure 5:
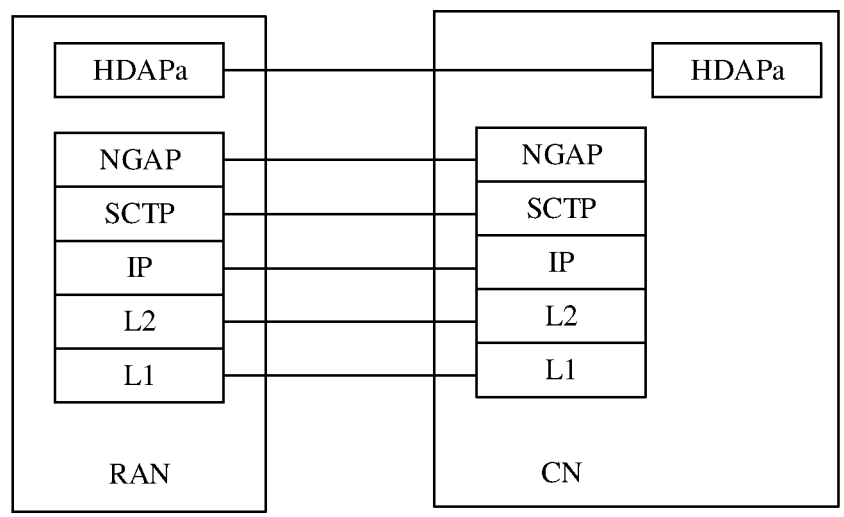
FIG. 5 is a schematic diagram of sending communication prediction or a communication prediction request according to an embodiment of this application.

4. Refer to FIG. 5. The communication prediction result is sent to the first RAN device by using a high data analytics protocol annex (HDAPa). The HDAPa protocol supports functions such as data transmission (such as data segmentation and data sorting) between the first RAN device and the core network device and data security (such as data integrity protection, data encryption, and data decryption). The HDAPa may use a service provided by the NGAP. In other words, an HDAPa message is carried in an NGAP message.

In subsequent descriptions of this embodiment of this application, that the communication prediction result or the communication prediction request is sent by using some messages may further be expressed as that the corresponding messages each carry the communication prediction result or the communication prediction request. The two may be replaced with each other, and no additional description is provided subsequently.

In another possible implementation, the second network device in operation 301 may be a second RAN device, and the second RAN device may send the communication prediction result to the first RAN device in the following manners.

1. The communication prediction result is sent to the first RAN device by using UE-associated signaling. For example, the communication prediction result is sent by using a handover request message or a secondary-node addition request (s-node addition request) message.

2. The communication prediction result is sent to the first RAN device by using non-UE associated signaling. For example, the communication prediction result is sent by using an Xn setup request message or an NG-RAN node configuration update message.

Optionally, the UE-associated signaling and the non-UE associated signaling may be transmitted according to a control plane protocol of the Xn interface, for example, transmitted according to a next generation application protocol (XnAP).

3. The communication prediction result is sent to the first RAN device according to a new radio user plane protocol. For example, the communication prediction result is sent by using assistance information data. The new radio user plane protocol is a user plane protocol of the Xn interface, and is used to provide non-guaranteed distribution for a user plane PDU between the RAN devices.

Figure 6:
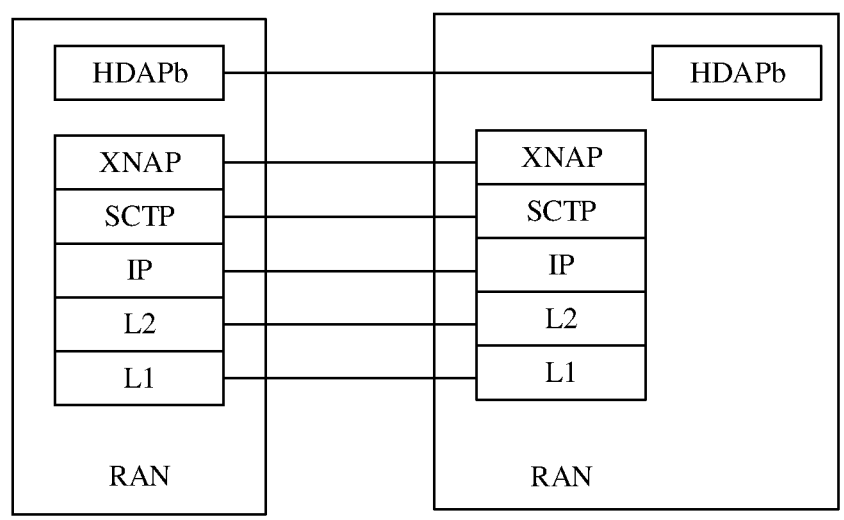
FIG. 6 is another schematic diagram of sending communication prediction or a communication prediction request according to an embodiment of this application.

4. Refer to FIG. 6. The communication prediction result is transmitted according to a high data analytics protocol type b (HDAPb). The HDAPb protocol supports functions such as data transmission (such as data segmentation and data sorting) between the first RAN device and the second RAN device and data security (such as data integrity protection, data encryption, and data decryption). The HDAPb uses a service provided by the XnAP. In other words, an HDAPb message may be carried in an XnAP message.

In another possible implementation, the second network device in operation 301 may be the CU or the CU-CP, and the first RAN device may be the DU. The CU or the CU-CP may send the communication prediction result to the DU in the following manners.

1. The communication prediction result is sent to the DU by using UE-associated signaling. For example, the communication prediction result is sent by using a UE context setup request message or a UE context modification request message.

2. The communication prediction result is sent to the DU by using non-UE associated signaling. For example, the communication prediction result is sent by using an F1 setup response message or a CU configuration update message.

Optionally, the UE-associated signaling and the non-UE associated signaling may be transmitted according to a control plane protocol of the F1 interface, for example, transmitted according to an F1 application protocol (F1AP).

Figure 7:
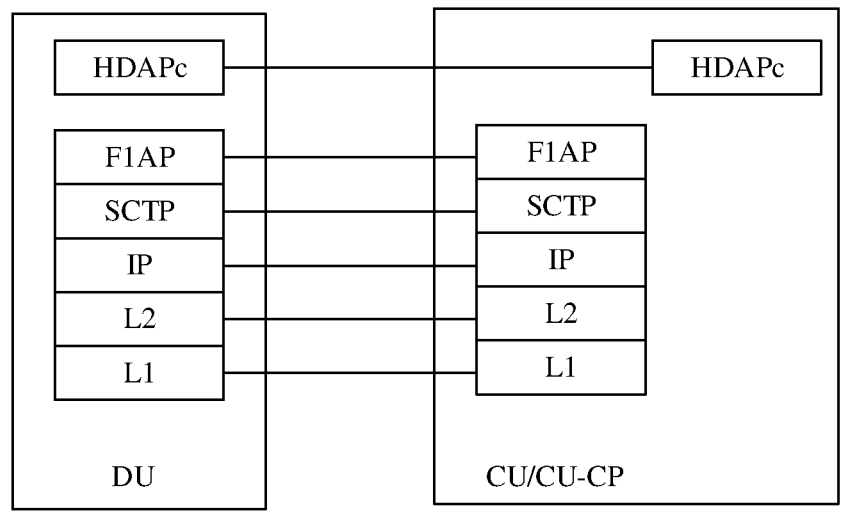
FIG. 7 is still another schematic diagram of sending communication prediction or a communication prediction request according to an embodiment of this application.

3. Refer to FIG. 7. The communication prediction result is transmitted according to a high data analytics protocol type c (HDAPc). The HDAPc protocol supports functions such as data transmission (such as data segmentation and data sorting) between the CU/CU-CP and the DU and data security (such as data integrity protection, data encryption, and data decryption). The HDAPc uses a service provided by the F1AP. In other words, an HDAPc message may be carried in an F1AP message.

In another possible implementation, the second network device in operation 301 may be a network control device. The network control device may also be referred to as a management system. The management system may be an operations, administration and maintenance (OAM) system or a network management system. The network control device may be configured to manage the first RAN device.

Step 302: The first RAN device performs an energy saving operation based on the communication prediction result. Optionally, the first RAN device may determine, based on the communication prediction result, whether to perform the energy saving operation. If the energy saving operation may be performed, the first RAN device then performs the energy saving operation. In a solution, the first RAN device may directly determine, based on traffic load of the first RAN device, whether to perform the energy saving operation. However, inappropriate traffic load determining causes a failure to meet a quality of service of a user. For example, when load of a current user in a cell is low, the first RAN device determines that a condition for switching off a radio frequency channel is met, and therefore the first RAN device switches off the radio frequency channel of the cell, and migrates the user in the cell to a target cell. However, after the radio frequency channel of the current cell is switched off, if traffic of the user in the target cell rapidly increases, the target cell is overloaded. As a result, the quality of service of the user cannot be met. However, in the solution in FIG. 3, the second network device may predict a communication behavior of the first RAN device in advance, and send a prediction result to the first RAN device. When performing the energy saving operation, the first RAN device further considers a future communication behavior in addition to current traffic load. With reference to the two, whether to perform the energy saving operation is determined. This ensures quality of service of a user while energy consumption of the first RAN device is reduced, and a compromise between network performance and the energy consumption is made.

Optionally, the energy saving operation in operation 302 includes but is not limited to the following.

1. Radio frequency channel switching off: A radio frequency is an electromagnetic frequency at which electromagnetic waves can be radiated to space. To be specific, the electromagnetic waves at this frequency can be transmitted through antennas and propagated at a light speed in free space in a form of alternating electromagnetic fields. When there is no service in the cell or service load decreases, and a specific specified time period is entered currently, the first RAN device switches off some transmit channels in the cell, to reduce energy consumption. For example, for a cell with four transmit antennas, transmit channels corresponding to antenna ports 0 and 3 are switched off, and the transmit channels corresponding to antenna ports 1 and 2 are reserved.

2. Carrier frequency switching off: A carrier frequency, also referred to as a carrier, is a modem that processes signals, and includes a unit for processing baseband signals (original electrical signals that are not modulated through spectrum shifting or conversion or the like) and a unit for processing radio frequency signals. When a quantity of users on the carrier frequency is small, the users are migrated to a carrier frequency that is of a target base station and that load has an enough capacity to accommodate, the carrier frequency is then switched off. This reduces energy consumption.

3. Symbol power saving: Signal modulation is in a unit of sine wave periodicity. Each sine wave periodicity is referred to as an orthogonal frequency division multiplexing (OFDM) symbol, and a modulated OFDM symbol is referred to as a symbol. The symbol may be $1/14$ ms (about 71 μs) in time domain, and may be 15 kHz in frequency domain. Each subframe is 1 ms (14 symbols) in time domain, and is an entire bandwidth in frequency domain. The first RAN device dynamically detects symbols on which no data is sent in a subframe, and turns off a power amplifier within a periodicity of these symbols on which "no data is sent".

In a possible implementation, when the received communication prediction result is the communication prediction result of the network slice, the communication prediction result of the cell, or the communication prediction result of each of the plurality of users, and the identifier of the group is included, the first RAN device may determine whether to perform the energy saving operation. If the energy saving operation is to be performed, the first RAN device may switch off the radio frequency channel or a carrier of the cell.

Example 1: The communication prediction result received by the first RAN device includes at least one of a start time point and duration, or traffic of the communication prediction of the network slice or the cell. In a possible implementation, the first RAN device may determine the communication period of the network slice or cell based on the start time point and the duration of the communication prediction of the network slice or the cell. The first RAN device switches off, in a non-communication period of the network slice or the cell, some transmit channels of the cell or a cell corresponding to the network slice, and performs an operation of switching off the radio frequency channel. This reduces energy consumption. In another possible implementation, when the traffic of the network slice or the cell is less than a threshold, the first RAN device may migrate the users in the cell or a cell corresponding to the network slice to another cell, and switch off the carrier frequency of the cell. This reduces energy consumption.

Example 2: When the communication prediction result of the network slice or the cell is periodic communication, the first RAN device may switch off, based on a periodic time interval when there is no data transmission, some transmit channels of the cell or a cell corresponding to the network slice, to perform an operation of switching off the radio frequency channel, or switch off the carrier frequency of the cell, to perform an operation of switching off the carrier frequency. This reduces energy consumption.

Example 3: When the communication prediction result of the network slice or the cell is burst communication, the first RAN device may switch on the carrier frequency and the transmit channels of the cell within a period of time of the burst communication, and switch off the carrier frequency of the cell or the transmit channels of the cell in another period of time. This reduces energy consumption.

In another possible implementation, when the received communication prediction result is the communication prediction result of the single user, or the communication prediction result of each of the plurality of users, and identifiers of the plurality of user are included, the first RAN device may determine whether to perform the energy saving operation. If the energy saving operation is to be performed, the first RAN device may perform delayed scheduling and symbol power saving. The delayed scheduling refers to delaying sending of data that can be sent within a transmission time interval (TTI), and the data is aggregated to another TTI to perform sending, where the another TTI may be a TTI corresponding to a common signal or a reference signal. The TTI is an arrival interval of a transport block set (TBS), namely, a period of time required for transporting one TBS. One TTI has a minimum length of one subframe in time domain. In other words, one TTI occupies at least 14 symbols. Through delayed scheduling, more time windows in which no data is sent may be obtained.

Figure 4:
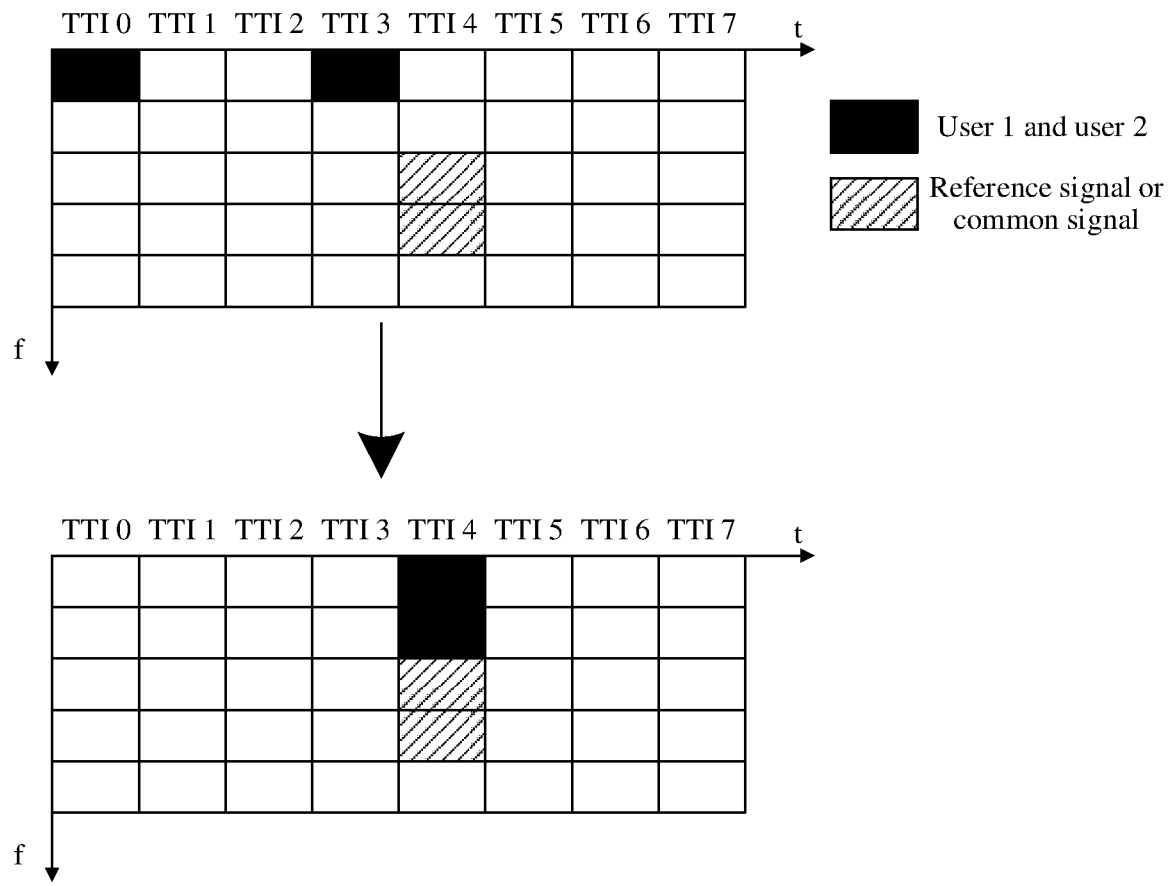
FIG. 4 is a schematic diagram of delayed scheduling according to an embodiment of this application.

As shown in FIG. 4, when the communication prediction result includes communication prediction results of a user 1 and a user 2, optionally, the communication prediction result may include communication start time points, duration, traffic, and the like of the user 1 and the user 2, or include periodic communication indications and periodic time intervals of the user 1 and the user 2, or include a time point at which burst communication of the user 1 occurs and a time point at which burst communication of the user 2 occurs, uplink data traffic volumes or downlink data traffic volumes of the burst communication, and the like. The first RAN device may determine, based on the communication prediction result of the user 1, that data of the user 1 can be sent within a TTI 0, and determine, based on the communication prediction result of the user 2, that data of the user 2 can be sent within a TTI 3. In this case, the first RAN device may perform delayed scheduling on the data of the user 1 and the data of the user 2, and aggregate the data to a TTI 4 corresponding to a common signal or a reference signal to perform sending. In this case, if no data is sent in the TTI 0 and the TTI 3, the first RAN device may perform power saving on symbols corresponding to the TTI 0 and the TTI 3. This reduces energy consumption.

It can be learned from the foregoing descriptions that the second network device sends the communication prediction result to the first RAN device, and the first RAN device determines, based on the communication prediction result, whether to perform an energy saving operation and a possible specific energy saving manner. This ensures quality of service of a user while energy consumption of the first RAN device is reduced, and a compromise between network performance and the energy consumption is made.

Optionally, the procedure shown in FIG. 3 may further include operation 300, the first RAN device sends a communication prediction request to a second network device. When receiving the communication prediction request, the second network device obtains the communication prediction result, and then performs the operation of sending a communication prediction result to the first RAN device in operation 301. The communication prediction request may be a communication prediction request that is based on a single user, a communication prediction request that is based on a plurality of users, a communication prediction request that is based on a cell, or a communication prediction request that is based on a network slice. This is not limited in this specification.

In a possible implementation, the first RAN device may periodically send the communication prediction request to the second network device. For example, the first RAN device may send the communication prediction request to the second network device every 20 ms. Alternatively, when the first RAN device needs to perform the energy saving operation, the first RAN device may send the communication prediction request to the second network device. This is not limited.

In a possible implementation, when the communication prediction request in operation 300 is the communication prediction request that is based on the single user, the communication prediction request may further include an identifier of the single user. Alternatively, when the communication prediction request in operation 300 is the communication prediction request that is based on the plurality of users, the communication prediction request may further include identifiers of the plurality of users. One user identifier is associated with one communication prediction request. Alternatively, when the communication prediction request in operation 300 is the communication prediction request that is based on the plurality of users, the communication prediction request may further include an identifier of a group. Alternatively, when the communication prediction request in operation 300 is the communication prediction request that is based on the cell, the communication prediction request may further include an identifier of the cell. Alternatively, when the communication prediction request in operation 300 is the communication prediction request that is based on the network slice, the communication prediction request may further include an identifier of the network slice.

In a possible implementation, the second network device may be a core network device, and the first RAN device may send the communication prediction request to the core network device in the following manners.

1. The communication prediction request is sent to the core network device by using UE-associated signaling. For example, the communication prediction request is sent by using a PDU session resource modify indication message or an uplink non-access stratum transport message.

2. The communication prediction request is sent to the core network device by using non-UE associated signaling. For example, the communication prediction request is sent by using an NG setup response message or a RAN configuration update message.

3. The communication prediction request is sent to the core network device according to a PDU session user plane protocol. For example, the communication prediction request is sent by using uplink PDU session information.

4. Refer to FIG. 5. The communication prediction request is sent to the core network device according to an HDAPa protocol.

In a possible implementation, when the second network device is a second RAN device, the first RAN device may send the communication prediction request to the second RAN device in the following manners.

1. The communication prediction request is sent to the second RAN device by using UE-associated signaling. For example, the communication prediction request is sent by using a retrieve UE context request message.

2. The communication prediction request is sent to the second RAN device by using non-UE associated signaling. For example, the communication prediction request is sent by using an Xn setup response message or an NG-RAN node configuration update message.

3. The communication prediction request is sent to the second RAN device according to a new radio user plane protocol. For example, the communication prediction request is sent by using downlink user data.

4. Refer to FIG. 6. The communication prediction request is sent to the second RAN device according to an HDAPb protocol.

In another possible implementation, when the first RAN device is a DU, and the second network device is a CU or a CU-CP, the DU may send the communication prediction request in the following manners.

1. The communication prediction request is sent by using UE-associated signaling. For example, the communication prediction request is sent by using a UE context modification required message.

2. The communication prediction request is sent by using non-UE associated signaling. For example, the communication prediction request is sent by using an F1 setup request message or a DU configuration update message.

3. Refer to FIG. 7. The communication prediction request is sent according to an HDAPc protocol.

It can be learned from the foregoing descriptions that the first RAN device may timely trigger the request based on a network status of the first RAN device, and obtain a communication prediction result. In addition, the first RAN device sends a specific communication prediction request to the second network device, to avoid that the second network device sends unnecessary communication prediction to the first RAN device. This reduces signaling overheads.

In a possible implementation, the second network device may be a network control device. In this case, the first RAN device may send the communication prediction request to the network control device. When receiving the communication prediction request, the network control device obtains a communication prediction result, and sends the communication prediction result to the first RAN device.

In a possible implementation, the first RAN device may request a communication behavior of a network slice, a cell, a user, or the like within a first time period. The communication prediction request in operation 300 may include indication information of the first time period. When receiving the communication prediction request, the second network device may obtain a communication prediction result within the first time period, and send the communication prediction result to the first RAN device, so that the first RAN device may obtain a more accurate communication prediction result.

An embodiment of this application further provides a communication method. The communication method includes a first RAN device obtains a communication prediction result by predicting a communication behavior of a cell, a user, or a network slice in the first RAN device. The first RAN device performs an energy saving operation based on the communication prediction result. A manner in which a first RAN device obtains a communication prediction result includes but is not limited to the following.

The first RAN device obtains a start time point, an end time point, duration, traffic, a user identifier, a network slice identifier S-NSSAI, a cell identifier, or the like of communication that already exists in the first RAN device, and processes the foregoing information based on a preset artificial intelligence model, to obtain a communication prediction result of a user, a network slice, or a cell in the first RAN device.

The methods provided in embodiments of this application are described above in detail with reference to FIG. 1 to FIG. 7. Apparatuses provided in embodiments of this application are described below in detail with reference to FIG. 8 and FIG. 9. It should be understood that descriptions of apparatus embodiments may correspond to descriptions of the method embodiments. Therefore, for content that is not described in detail, refer to the descriptions in the foregoing method embodiments.

Figure 8:
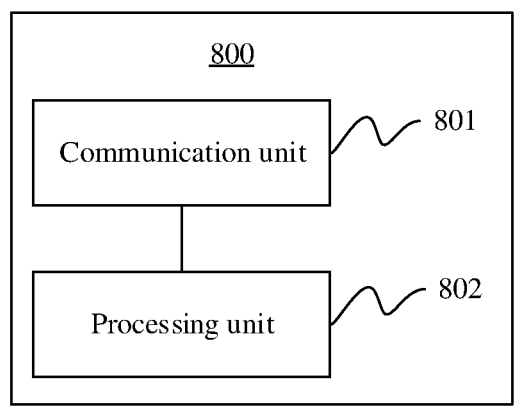
FIG. 8 is a schematic diagram of an apparatus according to an embodiment of this application.

FIG. 8 is a schematic block diagram of an apparatus 800 according to an embodiment of this application, which is configured to implement a function of the first RAN device or the second network device in the foregoing method embodiments. For example, the apparatus may be a software unit or a chip system. The chip system may include a chip, or may include a chip and another discrete device. The apparatus includes a communication unit 801, and may further include a processing unit 802. The communication unit 801 may communicate with the outside. The communication unit 801 may also be referred to as a communication interface, a transceiver unit, an input/output interface, or the like. The processing unit 802 is configured to perform processing.

In an example, the apparatus 800 may implement the function of the first RAN device. The apparatus 800 may be the first RAN device, or may be a chip or a circuit configured in the first RAN device. The communication unit 801 is configured to perform a transceiver operation on a first RAN device side in the foregoing method embodiments, and the processing unit 802 is configured to perform a processing related operation on the first RAN device side in the foregoing method embodiments.

For example, the communication unit 801 is configured to receive a communication prediction result from a second network device. The communication prediction result includes one or more of a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. The processing unit 802 is configured to perform an energy saving operation based on the communication prediction result.

Optionally, the communication prediction result is a communication prediction result of a network slice, a communication prediction result of a cell, or a communication prediction result of each of a plurality of users belonging to a same group, and that the processing unit 802 performs an energy saving operation based on the communication prediction result includes determining, based on the communication prediction result, whether to perform the energy saving operation, and if the energy saving operation is to be performed, switching off a radio frequency channel or a carrier of the cell.

Optionally, the communication prediction result is a communication prediction result of a single user, or a communication prediction result of each of a plurality of users not belonging to a same group, and that the processing unit 802 performs an energy saving operation based on the communication prediction result includes determining, based on the communication prediction result, whether to perform the energy saving operation, and if the energy saving operation is to be performed, performing delayed scheduling and symbol power saving.

Optionally, that the communication unit 801 receives a communication prediction result from a second network device includes receiving a communication prediction result from a core network device, receiving a communication prediction result from a second RAN device, or receiving a communication prediction result from a network control device.

Optionally, the first RAN device is a distributed unit DU, and that the communication unit 801 receives a communication prediction result from a second network device includes receiving a communication prediction result from a central unit CU.

Optionally, the first RAN device is a distributed unit DU, and that the communication unit 801 receives a communication prediction result from a second network device includes receiving a communication prediction result from a central unit-control plane CU-CP.

Optionally, the second network device is the core network device. The communication prediction result may be carried in terminal device-associated signaling, non-terminal device-associated signaling, a protocol data unit (PDU) session user plane protocol, or a high data analytics protocol annex. The terminal device-associated signaling includes a PDU session resource setup request message or a downlink non-access stratum transport message, the non-terminal device-associated signaling includes a next-generation setup request message or an access and mobility management function AMF configuration update message, and the PDU session user plane protocol includes downlink PDU session information.

Optionally, the second network device is the second RAN device. The communication prediction result may be carried in terminal device-associated signaling, non-terminal device-associated signaling, a new radio user plane protocol, or a high data analytics protocol type b. The terminal device-associated signaling includes a handover request message or a secondary-node addition request message, the non-terminal device-associated signaling includes an Xn setup request message or an NG-RAN node configuration update message, and the new radio user plane protocol includes assistance information data.

Optionally, the first RAN device is a DU, and the second network device is a CU or a CU-CP. The communication prediction result may be carried in terminal device-associated signaling, non-terminal device-associated signaling, or a high data analytics protocol type c. The terminal device-associated signaling includes a UE context setup request message or a UE context modification request message, and the non-terminal device-associated signaling includes an F1 setup response message or a CU configuration update message.

Optionally, the communication unit 801 is further configured to send a communication prediction request to the second network device.

Optionally, the communication prediction request is a communication prediction request of the single user, a communication prediction request of each of the plurality of users, a communication prediction request of the network slice, or a communication prediction request of the cell.

In another example, the apparatus 800 may implement the function of the second network device. The apparatus 800 may be the second network device, or may be a chip, a circuit, or the like configured in the second network device. The communication unit 801 is configured to perform a transceiver operation of the second network device in the foregoing method embodiments, and the processing unit 802 is configured to perform a processing related operation of the second network device in the foregoing method embodiments.

For example, the processing unit 802 is configured to obtain a communication prediction result. The communication prediction result includes one or more of a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. The communication unit 801 is configured to send the communication prediction result to the first RAN device.

Optionally, the communication prediction result is a communication prediction result of a network slice, a communication prediction result of a cell, a communication prediction result of each of a plurality of users belonging to a same group, a communication prediction result of a single user, or a communication prediction result of each of a plurality of users not belonging to a same group.

Optionally, the second network device is a core network device, a second radio access network device, a network control device, a central unit CU, or a central unit-control plane CU-CP.

Optionally, the second network device is a core network device. The communication prediction result is carried in terminal device-associated signaling, non-terminal device-associated signaling, a protocol data unit (PDU) session user plane protocol, or a high data analytics protocol annex. The terminal device-associated signaling includes a PDU session resource setup request message or a downlink non-access stratum transport message, the non-terminal device-associated signaling includes a next-generation setup request message or an access and mobility management function AMF configuration update message, and the PDU session user plane protocol includes downlink PDU session information.

Optionally, the second network device is the second RAN device. The communication prediction result may be carried in terminal device-associated signaling, non-terminal device-associated signaling, a new radio user plane protocol, or a high data analytics protocol type b. The terminal device-associated signaling includes a handover request message or a secondary-node addition request message, the non-terminal device-associated signaling includes an Xn setup request message or an NG-RAN node configuration update message, and the new radio user plane protocol includes assistance information data.

Optionally, the first RAN device is a DU, and the second network device is a CU or a CU-CP. The communication prediction result may be carried in terminal device-associated signaling, non-terminal device-associated signaling, or a high data analytics protocol type c. The terminal device-associated signaling includes a UE context setup request message or a UE context modification request message, and the non-terminal device-associated signaling includes an F1 setup response message or a CU configuration update message.

Optionally, the communication unit 801 is further configured to receive a communication prediction request from the first RAN device.

Optionally, the communication prediction request is a communication prediction request of the single user, a communication prediction request of each of the plurality of users, a communication prediction request of the network slice, or a communication prediction request of the cell.

In embodiments of this application, division into the units is an example and is merely logical function division, and may be other division during actual implementation. In addition, functional units in embodiments of this application may be integrated into one processor, may exist alone physically, or two or more units may be integrated into one unit. The integrated unit may be implemented in a form of hardware, or may be implemented in a form of a software functional unit.

It can be understood that in the foregoing embodiment, a function of the communication unit can be implemented by a transceiver, and a function of the processing unit can be implemented by a processor. The transceiver may include a transmitter and/or a receiver, to respectively implement functions of a sending unit and/or a receiving unit. Descriptions are provided below by using examples with reference to FIG. 9.

Figure 9:
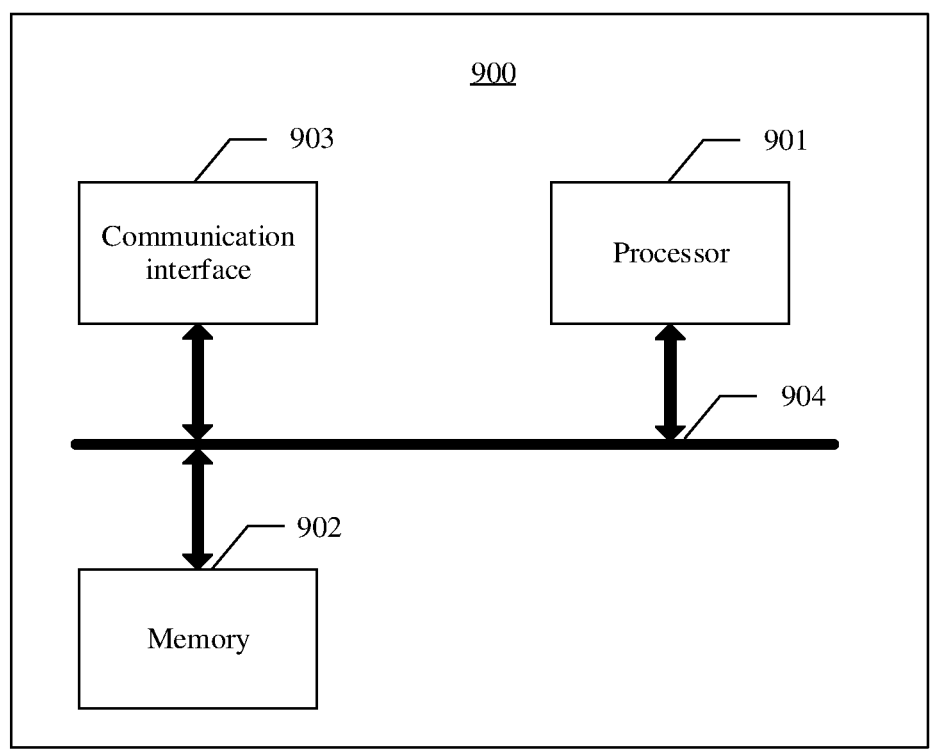
FIG. 9 is another schematic diagram of an apparatus according to an embodiment of this application.

The communication apparatus 900 shown in FIG. 9 includes at least one processor 901. The communication apparatus 900 may further include at least one memory 902, configured to store program instructions and/or data. The memory 902 is coupled to the processor 901. The coupling in this embodiment of this application may be indirect coupling or a communication connection between apparatuses, units, or modules in an electrical form, a mechanical form, or another form, and is used for information exchange between the apparatuses, the units, or the modules. The processor 901 may cooperate with the memory 902. The processor 901 may execute the program instructions stored in the memory 902. At least one of the at least one memory 902 may be included in the processor 901.

The apparatus 900 may further include a communication interface 903, configured to communicate with another device through a transmission medium, so that the communication apparatus 900 can communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

It should be understood that a connection medium between the processor 901, the memory 902, and the communication interface 903 is not limited in this embodiment of this application. In this embodiment of this application, the memory 902, the processor 901, and the communication interface 903 are connected through a communication bus 904 in FIG. 9. The bus is represented by using a thick line in FIG. 9. A connection manner between other components is merely an example for description, and is not limited. The bus may include an address bus, a data bus, a control bus, and the like. For ease of representation, only one thick line is used to represent the bus in FIG. 9, but this does not mean that there is only one bus or only one type of bus.

In an example, the apparatus 900 is configured to implement operations of the first RAN device in the foregoing method embodiments. The communication interface 903 is configured to perform a transceiver related operation of the first RAN device in the foregoing embodiments, and the processor 901 is configured to perform a processing related operation of the first RAN device in the foregoing method embodiments.

The communication interface 903 is configured to receive a communication prediction result from a second network device. The communication prediction result includes one or more of a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. The processor 901 is configured to perform an energy saving operation based on the communication prediction result.

Optionally, the communication prediction result is a communication prediction result of a network slice, a communication prediction result of a cell, or a communication prediction result of each of a plurality of users belonging to a same group, and that the processor 901 performs an energy saving operation based on the communication prediction result includes determining, based on the communication prediction result, whether to perform the energy saving operation, and if the energy saving operation is to be performed, switching off a radio frequency channel or a carrier of the cell.

Optionally, the communication prediction result is a communication prediction result of a single user, or a communication prediction result of each of a plurality of users not belonging to a same group, and that the processor 901 performs an energy saving operation based on the communication prediction result includes determining, based on the communication prediction result, whether to perform the energy saving operation, and if the energy saving operation is to be performed, performing delayed scheduling and symbol power saving.

Optionally, that the communication interface 903 receives a communication prediction result from a second network device includes receiving a communication prediction result from a core network device, receiving a communication prediction result from a second RAN device, or receiving a communication prediction result from a network control device.

Optionally, the first RAN device is a distributed unit DU, and that the communication interface 903 receives a communication prediction result from a second network device includes receiving a communication prediction result from a central unit CU, or receiving a communication prediction result from a central unit-control plane CU-CP.

Optionally, the second network device is a core network device. The communication prediction result is carried in terminal device-associated signaling, non-terminal device-associated signaling, a protocol data unit (PDU) session user plane protocol, or a high data analytics protocol annex. The terminal device-associated signaling includes a PDU session resource setup request message or a downlink non-access stratum transport message, the non-terminal device-associated signaling includes a next-generation setup request message or an access and mobility management function AMF configuration update message, and the PDU session user plane protocol includes downlink PDU session information.

Optionally, the second network device is the second RAN device. The communication prediction result may be carried in terminal device-associated signaling, non-terminal device-associated signaling, a new radio user plane protocol, or a high data analytics protocol type b. The terminal device-associated signaling includes a handover request message or a secondary-node addition request message, the non-terminal device-associated signaling includes an Xn setup request message or an NG-RAN node configuration update message, and the new radio user plane protocol includes assistance information data.

Optionally, the first RAN device is a DU, and the second network device is a CU or a CU-CP. The communication prediction result may be carried in terminal device-associated signaling, non-terminal device-associated signaling, or a high data analytics protocol type c. The terminal device-associated signaling includes a UE context setup request message or a UE context modification request message, and the non-terminal device-associated signaling includes an F1 setup response message or a CU configuration update message.

Optionally, the communication interface 903 is further configured to send a communication prediction request to the second network device.

Optionally, the communication prediction request is a communication prediction request of the single user, a communication prediction request of each of the plurality of users, a communication prediction request of the network slice, or a communication prediction request of the cell.

In another example, the apparatus 900 is configured to implement operations of the second network device in the foregoing method embodiments. The communication interface 903 is configured to perform a transceiver related operation of the second network device in the foregoing embodiments, and the processor 901 is configured to perform a processing related operation of the second network device in the foregoing method embodiments. For example, the processor 901 is configured to obtain a communication prediction result. The communication prediction result includes one or more of a communication period, traffic, a periodic communication indication, or a burst communication indication, the traffic represents at least one of a predicted uplink data traffic volume or a predicted downlink data traffic volume, the periodic communication indication represents whether communication predicted to occur is periodic, and if the communication predicted to occur is periodic, further represents at least one of a communication interval, the uplink data traffic volume, or the downlink data traffic volume of the periodic communication, and the burst communication indication represents whether the communication predicted to occur is bursty, and if the communication predicted to occur is bursty, further represents at least one of a time point, the uplink data traffic volume, or the downlink data traffic volume of the burst communication. The communication interface 903 is configured to send the communication prediction result to the first RAN device.

Optionally, the communication prediction result is a communication prediction result of a network slice, a communication prediction result of a cell, a communication prediction result of each of a plurality of users belonging to a same group, a communication prediction result of a single user, or a communication prediction result of each of a plurality of users not belonging to a same group.

Optionally, the second network device is a core network device, a second RAN device, a network control device, a central unit CU, or a central unit-control plane CU-CP.

Optionally, the second network device is a core network device. The communication prediction result may be carried in terminal device-associated signaling, non-terminal device-associated signaling, a protocol data unit (PDU) session user plane protocol, or a high data analytics protocol annex. The terminal device-associated signaling includes a PDU session resource setup request message or a downlink non-access stratum transport message, the non-terminal device-associated signaling includes a next-generation setup request message or an access and mobility management function AMF configuration update message, and the PDU session user plane protocol includes downlink PDU session information.

Optionally, the second network device is the second RAN device. The communication prediction result may be carried in terminal device-associated signaling, non-terminal device-associated signaling, a new radio user plane protocol, or a high data analytics protocol type b. The terminal device-associated signaling includes a handover request message or a secondary-node addition request message, the non-terminal device-associated signaling includes an Xn setup request message or an NG-RAN node configuration update message, and the new radio user plane protocol includes assistance information data.

Optionally, the first RAN device is a DU, and the second network device is a CU or a CU-CP. The communication prediction result may be carried in terminal device-associated signaling, non-terminal device-associated signaling, or a high data analytics protocol type c. The terminal device-associated signaling includes a UE context setup request message or a UE context modification request message, and the non-terminal device-associated signaling includes an F1 setup response message or a CU configuration update message.

Optionally, the communication interface 903 is further configured to receive a communication prediction request from the first RAN device.

Optionally, the communication prediction request is a communication prediction request of the single user, a communication prediction request of each of the plurality of users, a communication prediction request of the network slice, or a communication prediction request of the cell.

An embodiment of this application further provides an apparatus. The apparatus includes a unit configured to perform operations of the first RAN device in the foregoing method embodiments, or a unit configured to perform operations of the second network device in the foregoing method embodiments. A computer-readable storage medium is provided, including a program. When the program is run by a processor, the foregoing method of the first RAN device is performed, or the foregoing method of the second network device is performed. A computer program product is provided, including computer program code. When the computer program code is run on a computer, the computer is enabled to implement the foregoing method of the first RAN device or the foregoing method of the second network device. A chip is provided, including a processor. The processor is coupled to a memory, and the memory is configured to store a program or instructions. When the program or the instructions are executed by the processor, an apparatus is enabled to perform the foregoing method of the first RAN device or the foregoing method of the second network device.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in embodiments of this application. The general-purpose processor may be a microprocessor, any conventional processor, or the like. The operations in the methods disclosed with reference to embodiments of this application may be directly performed and completed by a hardware processor, or may be performed and completed by using a combination of hardware in the processor and a software module.

In embodiments of this application, the memory may be a nonvolatile memory, such as a hard disk drive (HDD) or a solid-state drive (SSD), or may be a volatile memory, for example, a random access memory (RAM). The memory is any other medium that can be used to carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

All or some of the methods provided in embodiments of this application may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on the computer, the procedure or functions according to embodiments of the present application are all or partially generated. The computer may be a general-purpose computer, a dedicated computer, a computer network, a network device, a user equipment, or another programmable apparatus. The computer instructions may be stored in a computer-readable storage medium or may be transmitted from a computer-readable storage medium to another computer-readable storage medium. For example, the computer instructions may be transported from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   receiving, by a radio access network device, a communication prediction result from a network device different from the radio access network device, wherein the communication prediction result comprises one or more of:
   a communication period,
   traffic representing at least one of a predicted uplink data traffic volume or a predicted downlink data traffic volume,
   a periodic communication indication representing whether communication predicted to occur is periodic and further representing, when the communication predicted to occur is periodic, at least one of a communication interval, the predicted uplink data traffic volume, or the predicted downlink data traffic volume of the periodic communication, or
   a burst communication indication representing whether the communication predicted to occur is bursty and further representing, when the communication predicted to occur is bursty, at least one of a time point, the predicted uplink data traffic volume, or the predicted downlink data traffic volume of burst communication; and
   performing, by the radio access network device, an energy saving operation based on the communication prediction result,
   wherein the network device is at least one of a core network device, a second radio access network device, a network control device, a central unit (CU), or a central unit-control plane (CU-CP).

2. The method according to claim 1, wherein the communication prediction result is at least one of a communication prediction result of a network slice, a communication prediction result of a cell, or a communication prediction result of each user of a plurality of users belonging to a same group; and wherein the performing, by the radio access network device, the energy saving operation based on the communication prediction result comprises:
   determining, by the radio access network device based on the communication prediction result, whether to perform the energy saving operation; and
   switching off, by the radio access network device in response to determining to perform the energy saving operation, a radio frequency channel or a carrier of the cell.

3. The method according to claim 1, wherein the communication prediction result is at least one of a communication prediction result of a single user, or a communication prediction result of each user of a plurality of users not belonging to a same group; and wherein the performing, by the radio access network device, the energy saving operation based on the communication prediction result comprises:
   determining, by the radio access network device based on the communication prediction result, whether to perform the energy saving operation; and
   performing, by the radio access network device in response to determining to perform the energy saving operation, delayed scheduling and symbol power saving.

4. The method according to claim 1, wherein the receiving, by the radio access network device, the communication prediction result from the network device comprises performing at least one of:
   receiving, by the radio access network device, the communication prediction result from the core network device;
   receiving, by the radio access network device, the communication prediction result from the second radio access network device; or
   receiving, by the radio access network device, the communication prediction result from the network control device.

5. The method according to claim 1, wherein the radio access network device is a distributed unit (DU); and
   wherein the receiving, by the radio access network device, the communication prediction result from a network device comprises:
      receiving, by the DU, the communication prediction result from the CU; or
      receiving, by the DU, the communication prediction result from the CU-CP.

6. The method according to claim 1, wherein the communication prediction result is carried in at least one of terminal device-associated signaling, non-terminal device-associated signaling, or protocol data unit (PDU) session user plane protocol information; and
   wherein the terminal device-associated signaling comprises at least one of a PDU session resource setup request message or a downlink non-access stratum transport message, wherein the non-terminal device-associated signaling comprises at least one of a next-generation setup request message or an access and mobility management function (AMF) configuration update message, and wherein the PDU session user plane protocol information comprises PDU session information.

7. A method, comprising:
   obtaining, by a network device, a communication prediction result, wherein the communication prediction result comprises one or more of:
   a communication period,
   traffic representing at least one of a predicted uplink data traffic volume or a predicted downlink data traffic volume,
   a periodic communication indication representing whether communication predicted to occur is periodic and further representing, when the communication predicted to occur is periodic, at least one of a communication interval, the predicted uplink data traffic volume, or the predicted downlink data traffic volume of the periodic communication, or
   a burst communication indication representing whether the communication predicted to occur is bursty and further representing, when the communication predicted to occur is bursty, at least one of a time point, the predicted uplink data traffic volume, or the predicted downlink data traffic volume of burst communication; and
   sending, by the network device, the communication prediction result to a radio access network device different from the network device,
   wherein the network device is at least one of a core network device, a second radio access network device, a network control device, a central unit (CU), or a central unit-control plane (CU-CP).

8. The method according to claim 7, wherein the communication prediction result is at least one of a communication prediction result of a network slice, a communication prediction result of a cell, a communication prediction result of each user of a plurality of users belonging to a same group, a communication prediction result of a single user, or a communication prediction result of each user of a plurality of users not belonging to a same group.

9. The method according to claim 7, wherein the communication prediction result is carried in at least one of terminal device-associated signaling, non-terminal device-associated signaling, or protocol data unit (PDU) session user plane protocol information; and
   wherein the terminal device-associated signaling comprises at least one of a PDU session resource setup request message or a downlink non-access stratum transport message, wherein the non-terminal device-associated signaling comprises at least one of a next-generation setup request message or an access and mobility management function (AMF) configuration update message, and wherein the PDU session user plane protocol information comprises PDU session information.

10. A radio access network device, comprising:
   a transceiver;
   at least one processor; and
   one or more memories coupled to the at least one processor and storing programming instructions for execution by the at least one processor, the programming instructions including instructions to:
   receive a communication prediction result from a network device different from the radio access network device, wherein the communication prediction result comprises one or more of:
   a communication period,
   traffic representing at least one of a predicted uplink data traffic volume or a predicted downlink data traffic volume, a periodic communication indication representing whether communication predicted to occur is periodic and further representing, when the communication predicted to occur is periodic, at least one of a communication interval, the predicted uplink data traffic volume, or the predicted downlink data traffic volume of the periodic communication, or a burst communication indication representing whether the communication predicted to occur is bursty and further representing, when the communication predicted to occur is bursty, at least one of a time point, the predicted uplink data traffic volume, or the predicted downlink data traffic volume of burst communication; and perform an energy saving operation based on the communication prediction result, wherein the network device is at least one of a core network device, a second radio access network device, a network control device, a central unit (CU), or a central unit-control plane (CU-CP).

11. The radio access network device according to claim 10, wherein the communication prediction result is at least one of a communication prediction result of a network slice, a communication prediction result of a cell, or a communication prediction result of each user of a plurality of users belonging to a same group; and wherein the programming instructions further include instructions to:
determine, based on the communication prediction result, whether to perform the energy saving operation; and
switch off at least one of a radio frequency channel or a carrier of the cell in response to determining to perform the energy saving operation.

12. The radio access network device according to claim 10, wherein the communication prediction result is at least one of a communication prediction result of a single user, or a communication prediction result of each user of a plurality of users not belonging to a same group; and wherein the programming instructions further include instructions to:
determine, based on the communication prediction result, whether to perform the energy saving operation; and
perform delayed scheduling and symbol power saving in response to determining to perform the energy saving operation.

13. The radio access network device according to claim 10, wherein the instructions to receive the communication prediction result from the network device include instructions to perform at least one of:
receive the communication prediction result from the core network device;
receive the communication prediction result from the second radio access network device; or
receive the communication prediction result from the network control device.

14. The radio access network device according to claim 10, wherein the radio access network device is a distributed unit (DU); and wherein the programming instructions further include instructions to perform at least one of:
receive a communication prediction result from the CU; or
receive a communication prediction result from the CU-CP.

15. The radio access network device according to claim 10, wherein the communication prediction result is carried in at least one of terminal device-associated signaling, non-terminal device-associated signaling, or protocol data unit (PDU) session user plane protocol information; and wherein the terminal device-associated signaling comprises at least one of a PDU session resource setup request message or a downlink non-access stratum transport message, wherein the non-terminal device-associated signaling comprises at least one of a next-generation setup request message or an access and mobility management function (AMF) configuration update message, and wherein the PDU session user plane protocol information comprises PDU session information.

16. A network device, comprising:
a transceiver;
at least one processor; and
one or more memories coupled to the at least one processor and storing programming instructions for execution by the at least one processor, the programming instructions including instructions to:
obtain a communication prediction result, wherein the communication prediction result comprises one or more of:
a communication period,
traffic representing at least one of a predicted uplink data traffic volume or a predicted downlink data traffic volume,
a periodic communication indication representing whether communication predicted to occur is periodic and further representing, when the communication predicted to occur is periodic, at least one of a communication interval, the predicted uplink data traffic volume, or the predicted downlink data traffic volume of the periodic communication, or
a burst communication indication representing whether the communication predicted to occur is bursty and further representing, when the communication predicted to occur is bursty, at least one of a time point, the predicted uplink data traffic volume, or the predicted downlink data traffic volume of burst communication; and
send the communication prediction result to a radio access network device different from the network device,
wherein the network device is at least one of a core network device, a second radio access network device, a network control device, a central unit (CU), or a central unit-control plane (CU-CP).

17. The network device according to claim 16, wherein the communication prediction result is at least one of a communication prediction result of a network slice, a communication prediction result of a cell, a communication prediction result of each user of a plurality of users belonging to a same group, a communication prediction result of a single user, or a communication prediction result of each user of a plurality of users not belonging to a same group.

18. The network device according to claim 16, wherein the communication prediction result is carried in terminal device-associated signaling, non-terminal device-associated signaling, or protocol data unit (PDU) session user plane protocol information; and wherein the terminal device-associated signaling comprises at least one of a PDU session resource setup request message or a downlink non-access stratum transport message, wherein the non-terminal device-associated signaling comprises at least one of a next-generation setup request message or an access and mobility management function (AMF) configuration update message, and wherein the PDU session user plane protocol information comprises PDU session information.

19. The method of claim 1, wherein the communication prediction result received from the network device comprises the communication period, the traffic, the periodic communication indication, and the burst communication indication.

* * * * *